United States Patent
Nagayama (12) 
(10) Patent No.: US 10,169,462 B2
(45) Date of Patent: *Jan. 1, 2019

(54) CREATION OF STRUCTURAL DIAGRAM OF WEB SITE BASED ON BOTH PHYSICAL LINKS AND SEMANTIC LINKS OF WEB PAGES OF WEB SITE

(71) Applicant: International Business Machines Corporation, Armonk, NY (US)

(72) Inventor: Junichi Nagayama, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 223 days.

This patent is subject to a terminal disclaimer.

(21) Appl. No.: 15/206,078

(22) Filed: Jul. 8, 2016

(65) Prior Publication Data
US 2016/0321360 A1    Nov. 3, 2016

Related U.S. Application Data (63) Continuation of application No. 10/999,420, filed on Nov. 30, 2004, now Pat. No. 9,418,166.

(51) Int. Cl.
G06F 17/30  (2006.01)
G06F 17/27  (2006.01)
G06F 17/22  (2006.01)

(52) U.S. Cl.
CPC .... *G06F 17/30864* (2013.01); *G06F 17/2235* (2013.01); *G06F 17/2247* (2013.01); *G06F 17/2785* (2013.01); *G06F 17/3089* (2013.01)

(58) Field of Classification Search
None
See application file for complete search history.

(56) References Cited

U.S. PATENT DOCUMENTS

| | | | | |
|---|---|---|---|---|
| 6,154,213 A | * | 11/2000 | Rennison | G06F 17/30716 345/428 |
| 6,237,006 B1 | * | 5/2001 | Weinberg | G06F 11/32 345/419 |
| 7,502,785 B2 | | 3/2009 | Chen et al. | |

(Continued)

FOREIGN PATENT DOCUMENTS

| | | |
|---|---|---|
| JP | 09-185633 | 7/1997 |
| JP | 10-171703 | 6/1998 |

(Continued)

OTHER PUBLICATIONS

Non-final office action for U.S. Appl. No. 10/999,420 dated Mar. 31, 2009, 6 pp.

(Continued)

*Primary Examiner* — Christopher J Fibbi
(74) *Attorney, Agent, or Firm* — Daniel Simek (57) ABSTRACT

A structural diagram for a web site based on both the physical links and the semantic links of the web pages of the web site is created by determining the physical links among the web pages of the web site and the semantic links among the web pages. The physical links and the semantic links among web the pages are combined to yield the structural diagram of the web site. The physical links can be defined by the hyperlinks among the web pages. The semantic links can be defined by a directory structure of the directories within which the web pages are stored.

9 Claims, 7 Drawing Sheets

(56) References Cited

U.S. PATENT DOCUMENTS

| | | |
|---|---|---|
| 9,418,166 B2 | 8/2016 | Nagayama |
| 2004/0102610 A1 | 5/2004 | de Sauvage et al. |
| 2004/0210826 A1 | 10/2004 | Najork |
| 2005/0044192 A1* | 2/2005 | Applin ............... G06F 17/3089 709/223 |
| 2006/0117262 A1 | 6/2006 | Nagayama |
| 2006/0149833 A1 | 7/2006 | Dan et al. |
| 2006/0235841 A1 | 10/2006 | Betz et al. |
| 2006/0235842 A1 | 10/2006 | Szekely et al. |
| 2007/0011042 A1 | 1/2007 | Kim |
| 2007/0011336 A1 | 1/2007 | Jarrad et al. |
| 2007/0239712 A1 | 10/2007 | Chen et al. |
| 2007/0239792 A1 | 10/2007 | Chen et al. |
| 2009/0018988 A1 | 1/2009 | Abrams et al. |

FOREIGN PATENT DOCUMENTS

| | | |
|---|---|---|
| JP | 2000-305835 | 11/2000 |
| JP | 2000-348052 | 12/2000 |
| JP | 2001-075859 | 3/2001 |
| JP | 2003-085208 | 3/2003 |
| JP | 2003-296184 | 10/2003 |
| JP | 2003-303196 | 10/2003 |
| JP | 2003-303204 | 10/2003 |

OTHER PUBLICATIONS

Final office action for U.S. Appl. No. 10/999,420 dated Nov. 27, 2009, 14 pp.

Non-final office action for U.S. Appl. No. 10/999,420 dated Mar. 27, 2013, 13 pp.

Final office action for U.S. Appl. No. 10/999,420 dated Nov. 21, 2013, 15 pp.

Non-final office action for U.S. Appl. No. 10/999,420 dated Feb. 26, 2015, 19 pp.

Final office action for U.S. Appl. No. 10/999,420 dated Sep. 24, 2015, 22 pp.

Notice of allowance for U.S. Appl. No. 10/999,420 dated May 10, 2016, 12 pp.

* cited by examiner

FIG 1

PRIOR ART

CREATION OF STRUCTURAL DIAGRAM OF WEB SITE BASED ON BOTH PHYSICAL LINKS AND SEMANTIC LINKS OF WEB PAGES OF WEB SITE

FIELD OF THE INVENTION

The present invention relates generally to creating structural diagrams of web sites, and more particularly to creating such structural diagrams based on both the physical links and the semantic links of web pages of the web sites.

BACKGROUND OF THE INVENTION

A web site is a collection of web pages that are interconnect to one another with hyperlinks. The web pages of a web site are accessible over the Internet using a web browsing computer program on a client device communicating with a server device that hosts the web site. A hyperlink is a link from one web page of a web site to another web site. Clicking on a hyperlink within the web browsing computer program on the client device causes the client device to acquire, or load, and display the web page to which the hyperlink links, or refers.

Web sites can contain tens, hundreds, thousands, or more different web pages. As web sites have become more complex, therefore, the designers of the web sites usually want to view structural diagrams of the web sites in order to see the underlying relationships among the web pages of the web sites. A structural diagram of a web site thus shows the relationships among the web pages of the web site, and is useful for understanding the structure of the web site.

One way to create a structural diagram of a web site is to search the web pages of the web site for all of the hyperlinks contained within the web pages that refer to other web pages on the same web site. The hyperlinks of the web site are referred to as the physical links of the web site. A structural diagram of a web site that is built on the basis of the hyperlinks that link the web pages of the web site together can capture the physical structure of the web site. However, many times the resulting structural diagram will reflect weak interrelations among the web pages of a web site that can obscure the actual semantic structure of the web site.

Figure 1:
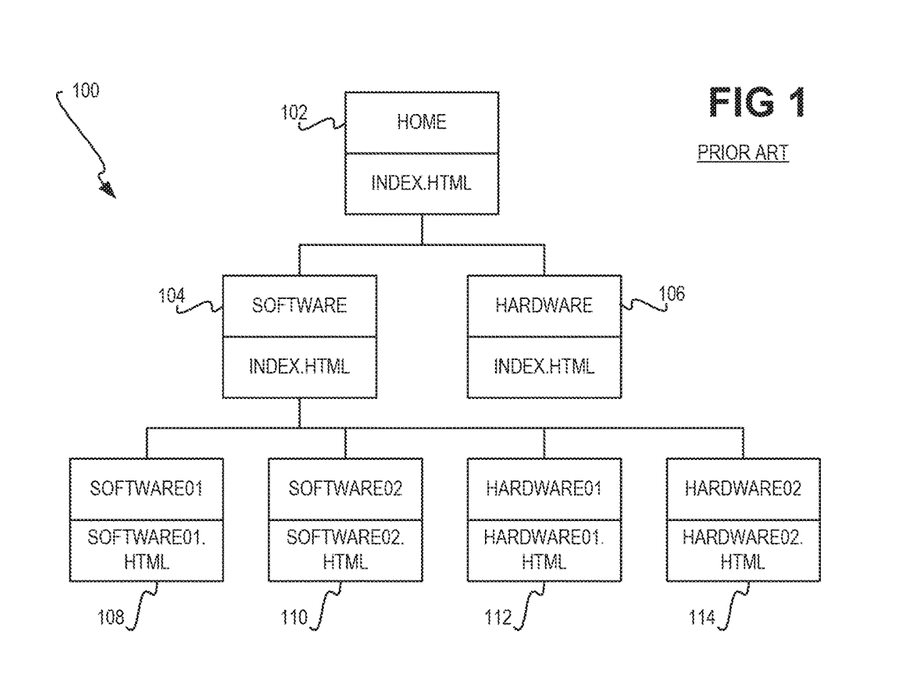
FIG. 1 is an example structural diagram of a web site created in accordance with the prior art by using only the physical links among the web pages of the web site.

For example, FIG. 1 shows an example structural diagram 100 of a web site that can be created in accordance with the prior art by searching the web pages of the web site for all the hyperlinks contained within the web pages that refer to other web pages of the same web site. Each of the nodes 102, 104, 106, 108, 110, 112, and 114 of the diagram 100 includes a name of a web page and the file name of the web page. For example, the node 102 has the name "home" and the file name "index.html." The node 102 represents a web page that links to the web pages represented by the nodes 104 and 106. The node 104 represents a web page that links to the web pages represented by the nodes 108, 110, 112, and 114.

The disadvantage to using only hyperlinks in creating the structural diagram 100 of the web site is evident from the inclusion of the nodes 112 and 114 as being pointed to by the node 104. The node 104 has the name "software," where the web page represented by the node 104 links to two other software-related web pages represented by the nodes 108 and 110 having the names "software01" and "software02," respectively. However, the web page represented by the node 104 also links to two hardware-related web pages represented by the nodes 112 and 114 having the names "hardware01" and "hardware02," respectively.

These hardware-related web pages may be linked from the software-related web page represented by the node 104 due to a navigation bar or other collection of hyperlinks present on the software-related web page represented by the node 104. By comparison, the software-related web pages represented by the nodes 108 and 110 may be linked within the primary portion of the web page represented by the node 104, and not only linked within the navigation bar. As such, the hardware-related web pages represented by the nodes 112 and 114 have a weak semantic relationship to the software-related web page represented by the node 104. Inclusion of the nodes 112 and 114 within the structural diagram 100, as being pointed to by the node 104, obscures the actual semantic structure of the web site.

Another prior art approach to creating the structural diagram of a web site is to use the directory structure of the directories within which the web pages of the web site are physically stored on a server device. The directory structure of the directories within which the web pages of a web site are physically stored yield links among the web pages that are referred to herein as to the semantic links of the web site. The physical links among the web pages of a web site are represented by the hyperlinks of the web pages, since these hyperlinks physically point to the web pages of the web site, whereas, the semantic links among the web pages of a web site are represented by the directory structure of the directories within which the web pages are physically stored. This is because it is presumed that there is an underlying organization to the directory structure, in that the designer of the web site has purposefully placed given web pages in given directories. However, these links are semantic, and not physical, because there may not be actual physical hyperlinks among the web pages within given directories. Rather, the links are semantic because they represent an intended underlying organization to the web pages of the web site due to their being stored in different directories.

Figure 2:
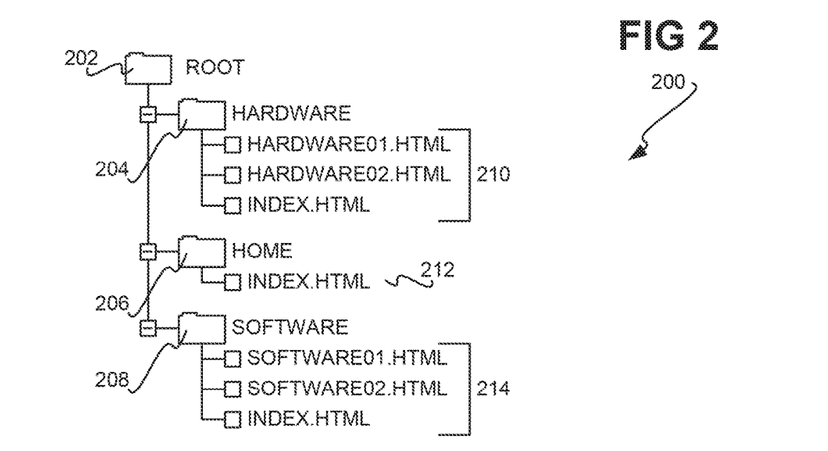
FIG. 2 is an example directory structure of directories within which the web pages of a web site may be stored.

For example, FIG. 2 shows an example directory structure 200 of directories 202, 204, 206, and 208 within which the physical files of the web pages of the web site having the structural diagram 100 of FIG. 1 are physically stored on a server device. Directories may also be referred to as folders herein. The root directory 202 includes a hardware directory 204, a home directory 206, and a software directory 208. The hardware directory 204 includes the files 210 that represent web pages; the home directory 204 includes the file 212 that represents a web page; and, the software directory 208 includes the files 214 that represent web pages.

Figure 3:
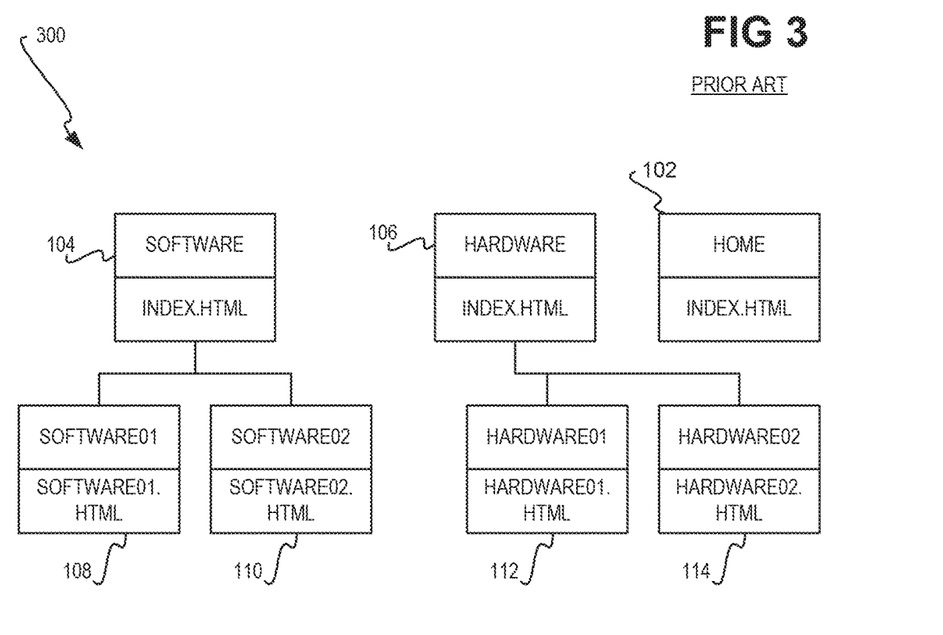
FIG. 3 is an example structural diagram of a web site created in accordance with the prior art by using only the semantic links among the web pages of the web site, based on the directory structure of FIG. 2.

FIG. 3 shows another example structural diagram 300 that can be created in accordance with the prior art based on the directory structure 200 of FIG. 2. The user may have initially indicated that files having file names of "index.html" represent the base, root, parent, or primary web page as compared to the other web pages represented by files stored in a given directory. Thus, the node 104 represents the software-related web page with the file name "index.html," such that the software-related web pages represented by files stored in the same directory 208, and having the file names "software01.html" and "software02.html," have corresponding nodes 108 and 110 to which the node 104 links within the diagram 300. Similarly, the node 106 represents the hardware-related web page with the file name "index.html." The hardware-related web pages represented by files stored in the same directory 204, and having the file names "hardware01.html" and "hardware02.html," having corresponding nodes 112 and 114 to which the node 106 links within the diagram 300.

The disadvantage to using only the directory structure of the directories within which the files of the web pages of a web site are physically stored to create the structural diagram 300 is evident from the node 102, representing the web page having the name "home" and having the file name "index.html" being isolated within the diagram 300. Because the home directory 206 of FIG. 2 is within the same hierarchical level as the hardware folder 204 and the software folder 208, using only the directory structure to create the diagram 300 does not yield the node 102 pointing to the nodes 104 and 106, as does the diagram 100 of FIG. 1. Thus, whereas this prior art approach to web site structural diagram creation properly has the node 104 pointing to the nodes 108 and 110, and the node 106 pointing to the nodes 112 and 114, it does not have the node 102 pointing to the nodes 104 and 106. Therefore, the designer of the web site still does not have an accurate portrayal of the structure of the web site when viewing the diagram 300.

Furthermore, the prior art approach that utilizes the directory structure of the directories within which the files of the web pages of a web site are physically stored to create a structural diagram for the web site may have other limitations that impede the creation of an accurate structural diagram. For example, in FIG. 2, the file within the hardware directory 204 that has the file name "index.html" may have instead been named "hardware.html". In such instance, if the prior art approach to creating the structural diagram is looking for a file having a file name "index.html" to use as the base, root, parent, or primary web page within the hardware directory 204, the resulting structural diagram will not be created correctly. That is, rather than the node 106 pointing to the nodes 112 and 114, as in the diagram 300 of FIG. 3, the nodes 106, 112, and 114 may be sibling nodes to one another, such that the node 106 does not pointing to the nodes 112 and 114.

There are thus disadvantages to using only the physical links among the web pages of a web site to create a structural diagram for the web site, where the physical links are the hyperlinks among the web pages of the web site. There are also disadvantages to using only the semantic links among the web pages of a web site to create a structural diagram for the web site, where the semantic links can be represented by the directory structure of the directories within which the web pages of the web site are physically stored. For these and other reasons, then, there is a need for the present invention.

SUMMARY OF THE INVENTION

The present invention relates to creating a structural diagram for a web site based on both the physical links and the semantic links of the web pages of the web site. In a most general embodiment of the invention, a method first determines the physical links among the web pages of the web site, where the physical links can be defined by the hyperlinks among the web pages. The method next determines the semantic links among the web pages, where the semantic links are defined by a directory structure within which the web pages are stored. The method finally combines the physical links and the semantic links among the web pages to yield the structural diagram of the web site.

In a more specific embodiment of the invention, a method (a) acquires information on a hierarchy of the structural diagram of a web site, which yields current level web pages and next level web pages of the web site. For each current level web page, the method (b) searches the current level web page for related web pages, and (c) adds each related web page to the next level web pages. Once all the current level web pages have been processed, the method (d) denotes the next level web pages as the new current level web pages, and (e) repeats (a), (b), (c), and (d) for the new current level web pages.

Furthermore, the searching of the current level web page for related web pages in (b) may be accomplished by (f) formulating a search path indicating an order of target web pages for which link sources are to be searched, and (g) performing a directory structure search for the related web pages using a directory structure for the web site. The searching of the current level web page for related web pages in (b) may further be accomplished by (h) performing a hyperlink search as to the current level web page and adding any web pages found in (g) and (h) as child web pages to the current level web page, and (i) repeating (f), (g), and (h) for any web page found in (h).

In addition, the performance of the directory structure search in (g) may be accomplished by (j) acquiring a directory in which the current level web page is stored, and (k) acquiring a list of web pages in the directory acquired in (j) and a list of sub-directories acquired within the directory acquired in (j). Next, the method (1) searches the list of web pages for a web page having a file name to serve as an index web page for the directory. In response to finding the index web page, the method (m) searches for a web page having a hyperlink to the index web page and that is a first parent web page to the index web page, in accordance with the search path formulated, and (n) adds the first parent web page to the structural diagram.

The performance of the directory structure search in (g) may additionally include (o) selecting a given web page from the list of web pages, and (p) searching for a web page having a hyperlink to the given web page and that is a second parent web page to the given page, in accordance with the search path formulated. In response to finding the second parent web page, the method (q) adds the second parent web page to the structural diagram. The terminology "first parent web page" and "second parent web page" is used only to distinguish that the parent web page is found in (m) as opposed to the parent web page being found in (p), where the two web pages may actually be the same web page. The method continues by (r) repeating (o), (p), and (q) for each other web page in the list of web pages, and then (s) repeating (k), (l), (m), (n), (o), (p), (q), and (r) for each sub-directory within the list of sub-directories.

Finally, an article of manufacture of an embodiment of the invention includes a computer-readable medium and means in the medium. The computer-readable medium may be a recordable data storage medium, a modulated carrier signal, or another type of computer-readable medium. The means is for integrating physical links among the web pages of a web site with semantic links among the web pages to yield a structural diagram of the web site. The physical links are defined by hyperlinks among the web pages, whereas the semantic links are defined by a directory structure within which the web pages of the web site are stored.

Embodiments of the invention provide for advantages over the prior art. Unlike the prior art approach that uses only physical links of the web pages of a web site to construct a structural diagram for the web site, the invention uses both physical links and semantic links. As a result, weak semantic links among the web pages of a web site that are reflected only by the physical links of the web pages, as has been described in relation to FIG. 1 above, are avoided. Similarly, unlike the prior art approach that uses only semantic links of the web pages of a web site to construct a structural diagram for the web site, the invention uses both semantic links and physical links. As a result, the physical links of the web pages that are not reflected by the semantic links of the web pages, too, may nevertheless be depicted in the resulting structural diagram, avoiding the problems that have been described in relation to FIG. 3 above.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 4:
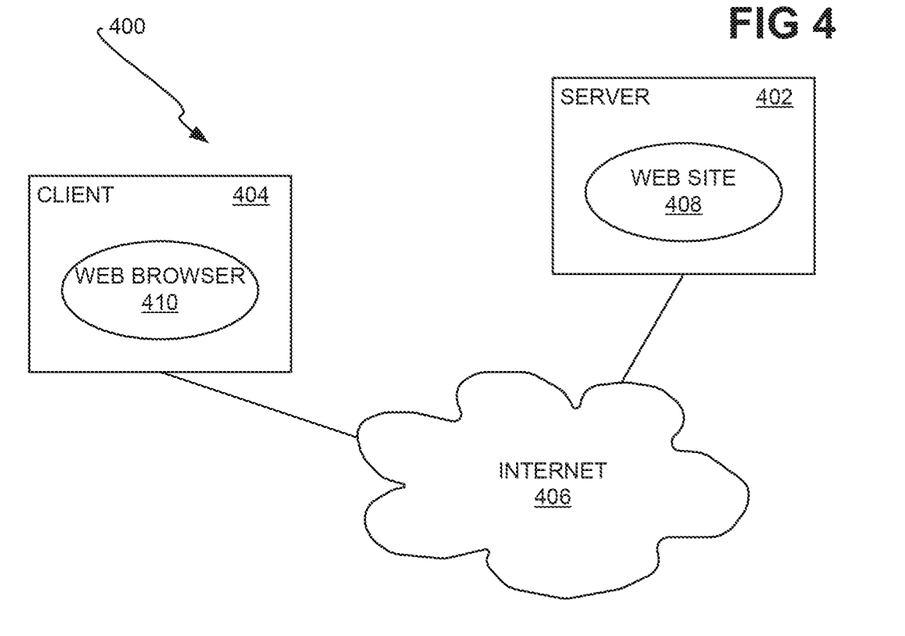
FIG. 4 shows an example system in which a server device hosts a web site accessible by a client device through a web browser computer program over the Internet, in conjunction with which embodiments of the invention may be practiced.

FIG. 4 shows a representative system 400, in accordance with which embodiments of the invention may be practiced. The system 400 includes a server device 402, a client device 404, which are communicatively connected to each other over the Internet 406. As can be appreciated by those of ordinary skill within the art, there may be more than one server device 402 and more than one client device 404, and other networks, in addition to the Internet 406, may be employed to communicatively connect the server device 402 and the client device 404.

The server device 402 hosts a web site 408. The web site 408 may be considered a collection of web pages stored as files on the server device 402. For instance, the collection of web pages may be stored as files having the directory structure organization depicted in FIG. 2 that has been described. The client device 404 has a web browser computer program 410 running thereon. The web browser computer program 410 downloads individual web pages of the web site 408 from the server device 402 over the Internet 406, and displays them at the client device 404.

Each of the web pages of the web site 408 may have one or more physical links to other web pages of the same web site 408 or to different web sites. These physical links are called hyperlinks. Thus, a user viewing a given web page on the client device 404 may select or click on a hyperlink on that web page. In response, the web browser 410 loads, or downloads, the web page to which this hyperlink corresponds from the server device 402, and displays this new web page on the client device 404. The repeated selection of different web pages on the same or different web sites is a process referred to as web browsing, or browsing the web, or browsing the Internet.

Figure 5:
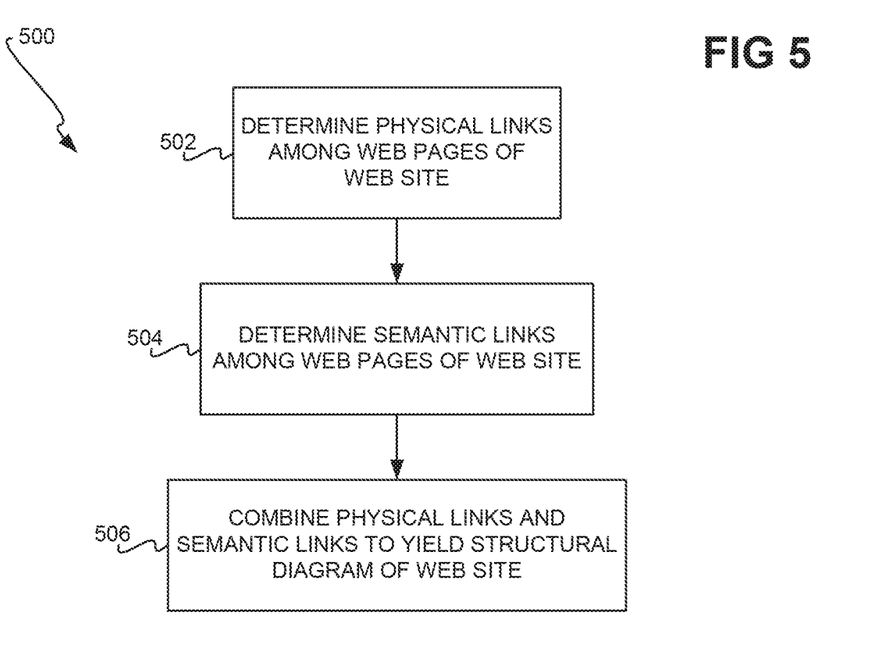
FIG. 5 shows a flowchart of the overall method by which at least some embodiments of the invention construct a structural diagram for a web site, and is suggested for printing on the first page of the patent.

FIG. 5 shows a rudimentary method 500 for constructing a structural diagram of a web site, such as the web site 408 of FIG. 4, according to an embodiment of the invention. The method 500 represents a functional delineation of an embodiment of the invention. A particular approach to implementing the functionality of the method 500 is described later in the detailed description. Like the other methods of other embodiments of the invention, the method 500 may be performed in whole or in part by one or more computer programs on a computing device. For instance, the computing device may be the server device 402 of FIG. 4, the client device 404, or another computing device.

The physical links among the web pages of the web site are determined (502). The physical links can be defined by the hyperlinks that link the web pages of the web site together. As has been described in the background section, the hyperlinks are physical links in that each hyperlink represents a direct linking, or relationship, of the web page on which the hyperlink is present to another web page to which the hyperlink points.

The semantic links among the web pages of the web site are also determined (504). The semantic links can be defined by the directory structure of the directories within which the web pages are stored. For instance, one such directory structure is depicted in FIG. 2, as has been described. The directory structure within which the web pages of the web site are stored defines or describes the semantic links among the web pages, because it is presumed that different web pages have been purposefully and organizationally placed in different directories by the web site designer. As such, the designer intended a given semantic structure of the web pages by virtue of his or her placement of the pages in the different directories. Furthermore, the directory structure does not define or describe physical links among the web pages, because there may not be a direct linking between or among the web pages of a given directory or sub-directory; rather, the relationship between or among such web pages may only be semantic.

Determining the semantic links is not restricted to either a specific formatting of the directory structure within which the web pages are stored, nor to a specific formatting of the file names of the files representing the web pages. For example, with respect to the directory structure of FIG. 2, it has been described that the prior art has difficulty where the home directory 206 has the same hierarchical level as the hardware directory 204 and the software directory 208, where the home page in the home directory 206 links to the primary pages in the directories 204 and 208. By comparison, at least some embodiments of the invention do not have such difficulty with this kind of directory structure; that is, they do not have such difficulty with this type of specific formatting of the directory structure. Furthermore, still with respect to the directory structure of FIG. 2, it has been described that the prior art has difficulty where the index.html file in the hardware directory 204 is instead named hardware.html. By comparison, at least some embodiments of the invention do not have such difficulty with this kind of file naming; that is, they do not have such difficulty with this type of specific formatting of the names.

Figure 6:
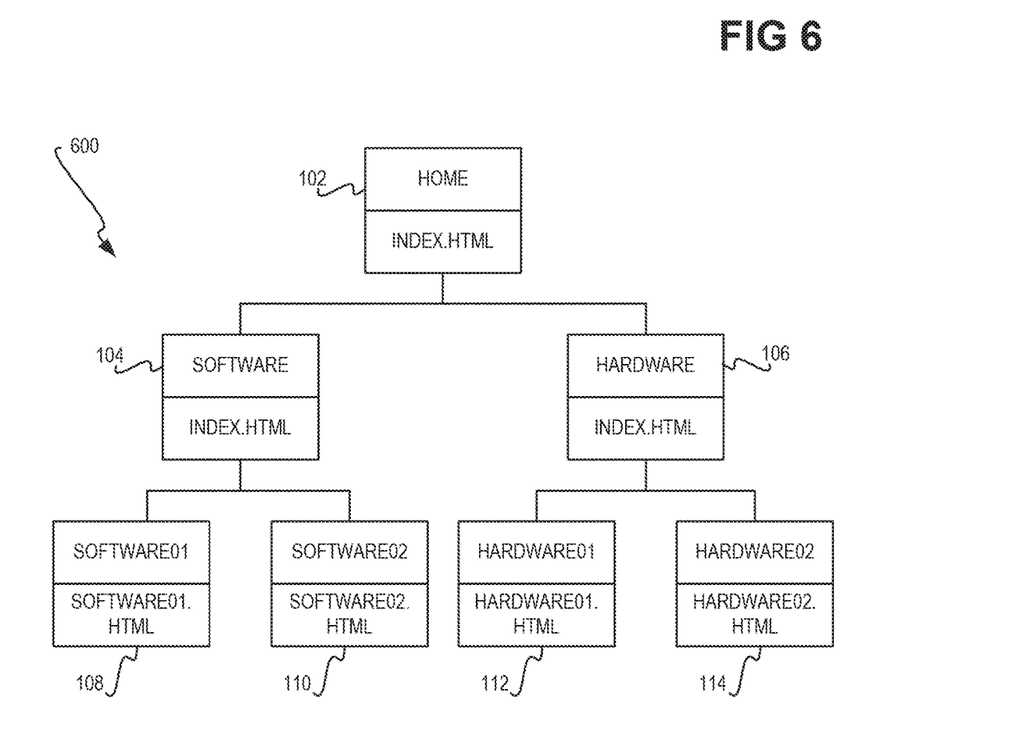
FIG. 6 is an example structural diagram of a web sited created in accordance with an embodiment of the invention.

FIG. 6 shows an example structural diagram 600 of a web site that can result from performing the method 500 of FIG. 5, or another method of the invention, according to an embodiment of the invention. The diagram 600 may be of the web site 408 of FIG. 4, for instance. The structural diagram 600 is more specifically of the same web site as the diagrams 100 of FIG. 1 and 300 of FIG. 3 that are generated in accordance with the prior art. Thus, the web site of the structural diagram 600 may have the directory structure 200 of FIG. 2, and may have a navigation bar or another collection of links in which the software web page represented by the node 104 points to the hardware-related pages represented by the nodes 112 and 114, as has been described in relation to FIG. 1 in the background section.

In the structural diagram 600 of FIG. 6, the node 102 links or points to the nodes 104 and 106. This part of the structural diagram 600 may have resulted from hyperlinks, or physical links, from the home page represented by the node 102 to the primary software page represented by the node 104 and to the primary hardware page represented by the node 106. Of all the web pages stored in the software directory 208 of FIG. 2, the user may have indicated that the web page represented by the node 104 is the primary page in this directory. Similarly, of all the web pages stored in the hardware directory 204 of FIG. 2, the user may have indicated that the web page represented by the node 106 is the primary page in this directory.

There are thus semantic links, represented by the directory structure 200 of FIG. 2, between the web page represented by the node 104 and the web pages represented by the nodes 108 and 110. Similarly, there are semantic links, represented by the directory structure 200, between the web page represented by the node 106 and the web pages represented by the nodes 112 and 114. Therefore, the parts of the structural diagram 600 in which the node 104 points to the nodes 108 and 110 and in which the node 106 points to the nodes 112 and 114 may have resulted from semantic links, resulting from the directory structure 200. That is, for these parts of the structural diagram 600, the hyperlinks or physical links that may have linked the primary software web page represented by the node 104 to the hardware-related web pages represented by the nodes 112 and 114 may have been ignored because they are weak semantically—they do not have corresponding semantic links within the directory structure 200, for instance.

Figure 7:
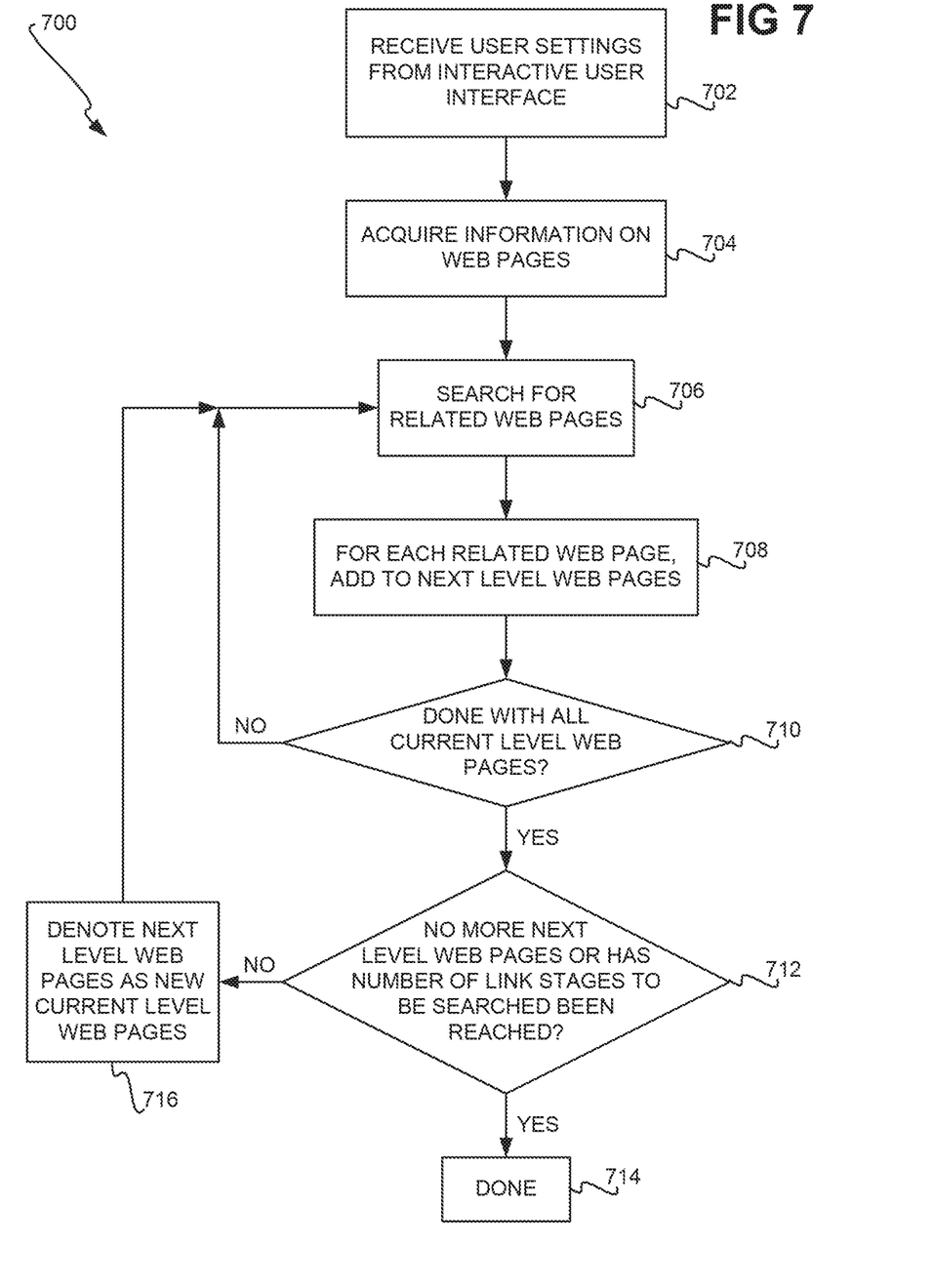
FIG. 7 is a method for constructing a structural diagram of a web site, consistent with but more detailed than the method of FIG. 5, according to an embodiment of the invention.

FIG. 7 shows a method 700 for constructing a structural diagram for a web site, according to an embodiment of the invention. The method 700, and its sub-methods and will be described, together implement the method 500 of FIG. 5 in one embodiment of the invention. First, user settings are received through an interactive user interface (702). This includes receiving user input as to a user-designated primary home web page, or top page, within the structural diagram for the web site. Furthermore, the user may specify whether semantic relationships among the web pages, based on the directory structure thereof, are to be evaluated in constructing the structural diagram. In addition, the user may specify the number of levels of links from the home web page that should be searched for inclusion within the structural diagram for the web site. After performance of 702, the remaining parts of the method 700 may be performed as part of an analytical computer program.

Information regarding the web pages of the web site is acquired (704). In particular, the information includes the hierarchy of the structural diagram of the web site. A first list of web pages is created that is at a current hierarchical level of the current web pages within the structural diagram, where the first level of web pages starts at the user-designated home web page for the diagram. Thus, the initial current level consists of a single web page, which is the user-designated home web page for the structural diagram. Web pages that are directly linked to from this home web page are considered next level web pages, and are placed in a second list of web pages. Each of these web pages in the second list is also at the same hierarchical level of web pages.

The information acquired in 704 is thus the determination of physical links among the web pages of the web site, based on hyperlinks from each current level web page to one or more next level web pages. This search is a breadth-first search in relation to each current level web page. A breadth-first search can be defined as a pattern of search in which a search proceeds to the next level only after the search has been completed at the current level—that is, all the children are first searched, followed by the search of the children's children, then by the search of the children's children's children, and so on. 704 is performed once to begin the web site structural diagram creation process. That is, 704 is performed in order to initially populate the first list of current level web pages and/or the second list of next level web pages with one or more web pages, so that the subsequent searching for related web pages in 706 can be performed in relation to one or more web pages. Furthermore, each current level web page found in 704—typically, just the home web page specified by the user—is added as a top-level node to the web site structural diagram to begin construction of the diagram.

Thus, for one of the current level web pages within the first list, related web pages are searched for (706). The manner by which related web pages are searched for is described in detail later in the detailed description. Each related web page that is found is added to the second list of next level web pages (708). If all the current level web pages within the first list have not been processed yet (710), then the method 700 repeats 706 and 708 for another current level web page, such that 706 and 708 are repeated for each current level web page within the first list.

Once all the current level web pages within the first list have been processed, the method 700 next determines whether there are any next level web pages and/or whether the number of link stages to be search has been reached (712). In the latter case, the user may have specified the number of levels to be searched in a breadth-first manner. For instance, specification of two levels means that the home web page is examined and the web pages that are in the next level list relative to the home web page. As another example, specification of three levels means that the home web page is examined, the web pages that are one level below the home web page are examined, and the web pages that are two levels below the home web pages are examined. If the predetermined (viz., user-designated) number of link stages has been reached (712), then the method 700 is finished (714), such that the structural diagram for the web site has been constructed, as will be described in more detail later in the detailed description.

Similarly, if the predetermined number of link stages has not yet been reached, but if the second list of next level web pages is empty (712), then the method 700 is also finished (714). However, if the predetermined number of link stages has not yet been reached, but if there are one or more pages within the second list of next level web pages (712), then the method 700 replaces the current level web pages in the first list with the next level web pages in the second list (716). That is, the first list of current level web pages is deleted, and the second list of next level web pages becomes a new first list, where the next level web pages become new current level web pages. A new second list is then started as an empty list. The method 700 then repeats 706, 708, and 710 for each of the new current level web pages, starting with one of the new current level web pages, and repeats 712 as to the new second list of next level web pages.

Figure 8:
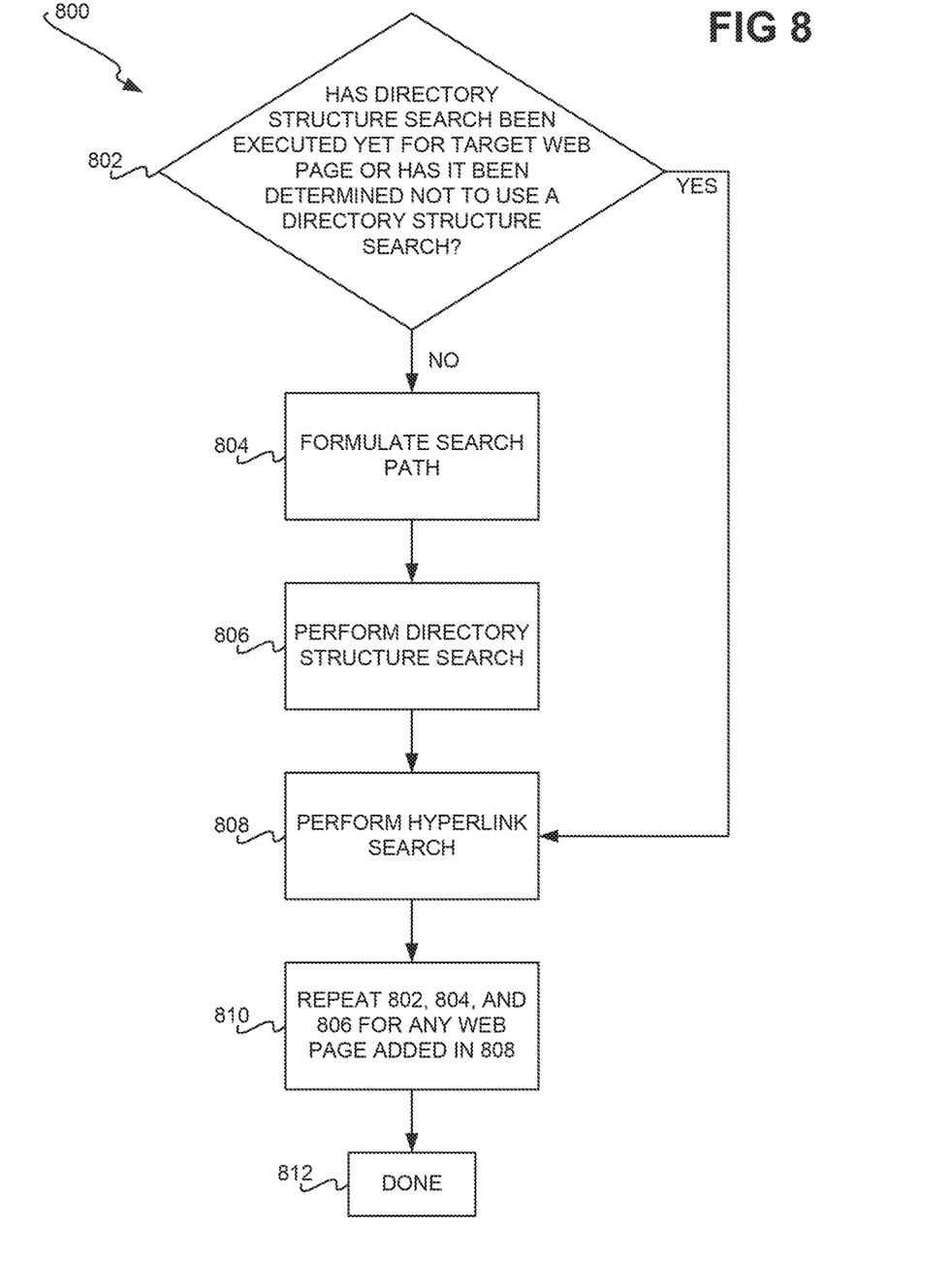
FIG. 8 is a method for searching for related web pages, and can be used as one of the steps or acts of the method of FIG. 7, according to an embodiment of the invention.

FIG. 8 shows a method 800 for searching for related web pages in relation to a current level (target) web page, according to an embodiment of the invention. That is, the method 800 is the implementation of 706 of the method 700 of FIG. 7 in one embodiment of the invention. First, if with respect to the target web page for which the method 800 is being performed, a directory structure search has already been performed (802), then the method 800 skips 804 and 806 and proceeds directly to 808. Similarly, if the user had previously indicated in the interactive user interface that a directory structure search should not be performed, then the method 800 proceeds directly to 808. The former test ensures that web pages do not have a directory structure search performed in relation thereto more than once. The latter test ensures that if a user does not want any directory structure searches to be performed, then none are indeed performed.

Thus, where a directory structure search is to be performed in relation to the current level target web page in question, then a search path is formulated as to this web page (804). The search path shows the order of target web pages for which sources of links are to be searched. That is, formulating the search path can include determining one or more web pages that are to be examined when searching for related web pages within the directory structure search.

In one embodiment, the search path is formulated as follows. First, the search path includes the directory path of the file of the current level target web page in question, such as "c:/software/index.html." Next, the web pages that are in the same directory as the file of the current level target web page are examined. Thus, they may include "c:/software/software01.html" and "c:/software/software02.html" as well. Therefore, the files in the search path is first examined to see if any web pages therein have a hyperlink to "c:/software/software01.html". The search path only includes "c:/software/index.html," so it is determined whether the page index.html has a link to software01.html. If so, then "c:/software/software01.html" is added to the search path, which is presumed in this example. Similarly, the files in the search path is now examined to see if any web pages therein have a hyperlink to "c:/software/software02.html". Because the search path now includes both "c:/software/index.html" and "c:/software/software01.html," these two pages are examined to determine whether either or both has a link to software02.html. If so, then "c:/software/software02.html" is added to the search path, too.

The directory structure search as to the current level target web page is then performed (806). The directory structure search is a search for semantic links from the current web page, and is the satisfaction of 504 of the method 500 of FIG. 5 with respect to this web page. The manner by which the directory structure search is actually performed is described in detail later in the detailed description.

Next, a hyperlink search is performed as to the current level target web page in question (808). 808 is also performed directly from 802 under certain conditions, as has been described. The web pages that result from the hyperlink search are added as children nodes within the web site structural diagram to the node representing the current level target web page. A hyperlink search is a search for links on the current level target web page to other web pages on the web site, as can be appreciated by those of ordinary skill within the art. For example, if a web page has hyperlinks to two other web pages, then the hyperlink search yields these two other web pages. The hyperlink search is thus a search for physical links from the current web page, and is the satisfaction of 502 of the method 500 of FIG. 5 with respect to this web page. The method continues by repeating 802, 804, and 806 for any web page that was found in 808 (810). Afterwards, the method 800 is finished (812).

Figure 9:
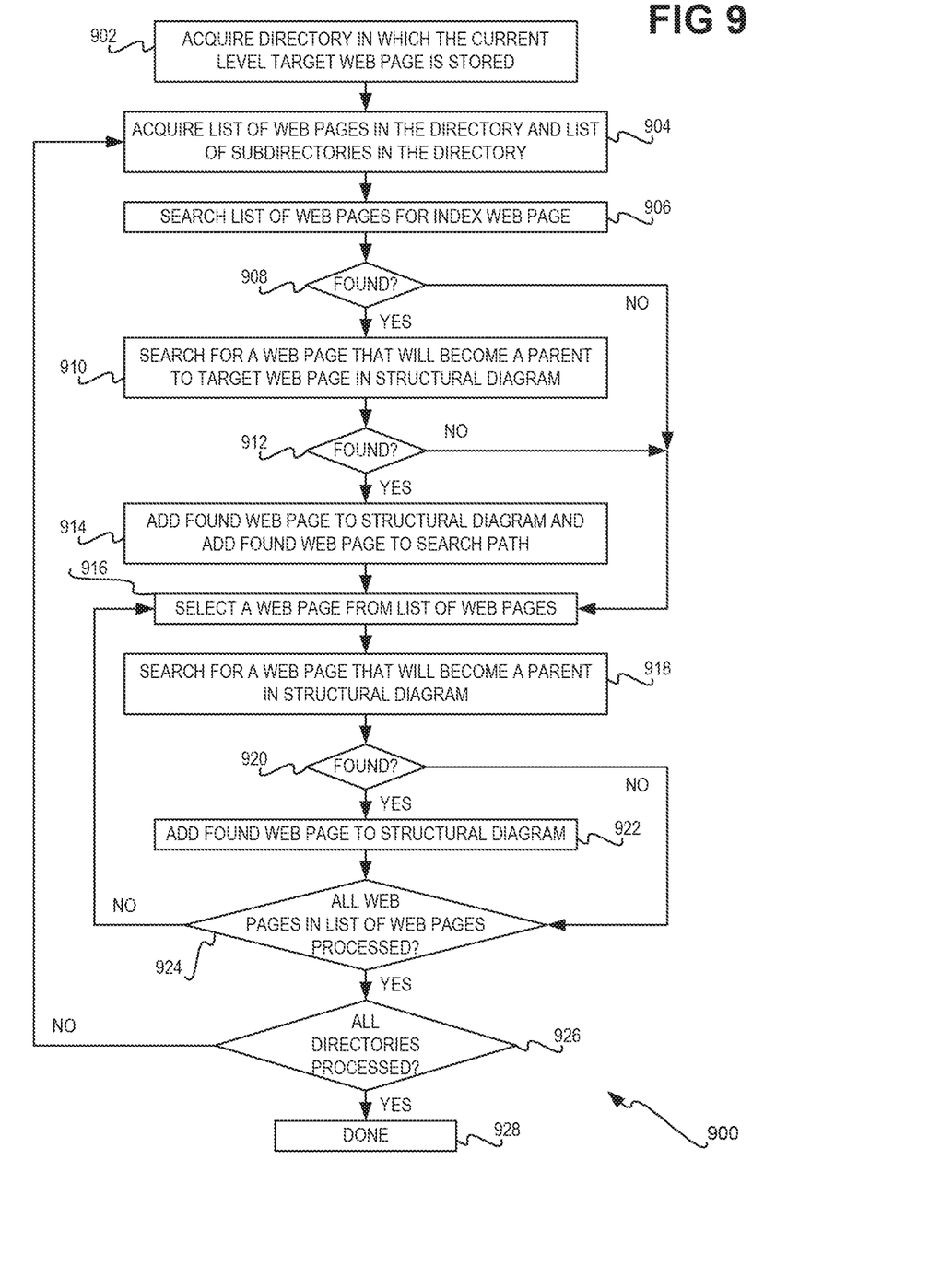
FIG. 9 is a method for performing a directory structure search, and can be used as one of the steps or acts of the method of FIG. 8, according to an embodiment of the invention.

FIG. 9 shows a method 900 for conducting a directory structure search in relation to a current level (target) web page, according to an embodiment of the invention. That is, the method 900 is the implementation of 806 of the method 800 of FIG. 8 in one embodiment of the invention. First, the directory in which the web page in question resides is acquired or determined (902). Next is, a list of web pages in that directory, as well as a list of subdirectories in that directory, are acquired, or determined (904). The list of web pages is searched for an index web page of the web pages in that directory (906). For instance, the user may have specified one or more different types of file names that signify that a corresponding web page is to be considered an index web page. Such a web page may be delineated as "index.html," as "hardware.html" where the other pages are delineated by "hardwareXX.html," where XX is a number, and so on.

If such a web page is not found (908), then the method 900 proceeds to 916. Otherwise, the method 900 searches for a web page that has a hyperlink to this index web page, in accordance with the search path previously formulated (910). That is, each source of hyperlinks and/or each web page provided in the search path is examined to see if there is a web page that has a hyperlink to the index web page. If such a web page is not found (912), then the method 900 proceeds to 916. Otherwise, a node is added for it to the structural diagram as a parent node to the node for the index web page (914). Furthermore, the found web page is added to the beginning of the search path that has been formulated. A node for the index web page is also added to the structural diagram if it has not already been added.

The method performs 916 after performing 914, or if an index web page was not found in 906, or if a parent web page to the index web page was not found in 910. The method 900 selects a web page from the list of web pages acquired or determined in 904 (916). For this web page, the method 900 searches for a web page that has a hyperlink to the selected web page, in accordance with a search path (918). That is, each source of hyperlinks and/or each web page provided in the search path is examined to see if there is a web page that has a hyperlink to the selected web page. If such a web page is not found (920), then the method 900 proceeds to 924. Otherwise, a node is added for it to the structural diagram as a parent node to the node for the selected web page (922). Furthermore, a node for the selected web page is also added to the structural diagram if it has not already been added.

The method performs 924 after performing 922, or if a parent web page to the selected web page was not found in 918. The method 900 determines whether all of the web pages in the list of web pages acquired or determined in 904 have been processed (924). If not, then the method 900 repeats beginning at 916 with a newly selected web page from this list. Otherwise, the method 900 determines whether all the subdirectories acquired in 904 have been processed (926). If not, then the method 900 repeats beginning at 904 with respect to another one of these subdirectories (926). Otherwise, the method 900 is finished (928).

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. It is manifestly intended that this invention be limited only by the claims and equivalents thereof.

What is claimed is:

1. A method comprising:
    determining a plurality of hyperlink physical links among a plurality of web pages of a web site;
    determining a plurality of non-hyperlink semantic links among the web pages;
    combining the hyperlink physical links and the non-hyperlink semantic links to generate a structural diagram of the web site having a plurality of structural links among the web pages; and
    displaying the structural diagram,
    wherein determining the non-hyperlink semantic links among the web pages comprises conducting a directory structure search in relation to a current level target web page by:
        (a) acquiring the directory in which the current level target web page is stored, as a selected directory;
        (b) acquiring a list of web pages in the selected directory and a list of subdirectories in the selected directory;
        (c) search the list of web pages for an index web page of the web pages in the selected directory;
        in response to locating the index web page:
        (d) searching for a first given web page that has a hyperlink to the index web page using a determined search path;
        in response to locating the first given web page,
        (e) adding the first given web page to the structural diagram and to the determined search path;
        (f) selecting a web page from the list of web pages, as a selected web page;
        (g) searching for a second given web page that has a hyperlink to the selected web page;
        in response to locating the second given web page,
        (h) adding the second given web page to the structural diagram and not to the determined search path.

2. The method of claim 1, wherein determining the non-hyperlink semantic links among the web pages is not restricted to a specific formatting of a directory structure within which the web pages are stored.

3. The method of claim 1, wherein determining the non-hyperlink semantic links among the web pages is not restricted to a specific formatting of file names of the web pages.

4. A computer program product comprising a non-transitory computer-readable storage medium having stored thereon program instructions executable by a computing device to cause the computing device to perform a method comprising:
    determining a plurality of hyperlink physical links among a plurality of web pages of a web site;
    determining a plurality of non-hyperlink semantic links among the web pages;
    combining the hyperlink physical links and the non-hyperlink semantic links to generate a structural diagram of the web site having a plurality of structural links among the web pages; and
    displaying the structural diagram,
    wherein determining the non-hyperlink semantic links among the web pages comprises conducting a directory structure search in relation to a current level target web page by:
        (a) acquiring the directory in which the current level target web page is stored, as a selected directory;
        (b) acquiring a list of web pages in the selected directory and a list of subdirectories in the selected directory;
        (c) search the list of web pages for an index web page of the web pages in the selected directory;
        in response to locating the index web page:
        (d) searching for a first given web page that has a hyperlink to the index web page using a determined search path;
        in response to locating the first given web page,
        (e) adding the first given web page to the structural diagram and to the determined search path;
        (f) selecting a web page from the list of web pages, as a selected web page;
        (g) searching for a second given web page that has a hyperlink to the selected web page;
        in response to locating the second given web page,
        (h) adding the second given web page to the structural diagram and not to the determined search path.

5. The computer program product of claim 4, wherein determining the non-hyperlink semantic links among the web pages is not restricted to a specific formatting of a directory structure within which the web pages are stored.

6. The computer program product of claim 4, wherein determining the non-hyperlink semantic links among the web pages is not restricted to a specific formatting of file names of the web pages.

7. A computing device comprising:
    a processor;
    a computer-readable storage medium storing computer-readable code executable by the processor to:
        determine a plurality of hyperlink physical links among a plurality of web pages of a web site;
        determine a plurality of non-hyperlink semantic links among the web pages;

combine the hyperlink physical links and the non-hyperlink semantic links to generate a structural diagram of the web site having a plurality of structural links among the web pages; and
display the structural diagram,
wherein processor is to determine the non-hyperlink semantic links among the web pages comprises conducting a directory structure search in relation to a current level target web page by:
- (a) acquiring the directory in which the current level target web page is stored, as a selected directory;
- (b) acquiring a list of web pages in the selected directory and a list of subdirectories in the selected directory;
- (c) search the list of web pages for an index web page of the web pages in the selected directory;
in response to locating the index web page:
- (d) searching for a first given web page that has a hyperlink to the index web page using a determined search path;

in response to locating the first given web page,
- (e) adding the first given web page to the structural diagram and to the determined search path;
- (f) selecting a web page from the list of web pages, as a selected web page;
- (g) searching for a second given web page that has a hyperlink to the selected web page;
in response to locating the second given web page,
- (h) adding the second given web page to the structural diagram and not to the determined search path.

8. The computing device of claim 7, wherein in determining the non-hyperlink semantic links among the web pages, the processor is not restricted to a specific formatting of a directory structure within which the web pages are stored.

9. The computing device of claim 7, wherein in determining the non-hyperlink semantic links among the web pages, the processor is not restricted to a specific formatting of file names of the web pages.

* * * * *